US012689675B2

(12) United States Patent
Padmanabhan et al.

(10) Patent No.: US 12,689,675 B2
(45) Date of Patent: Jul. 21, 2026

(54) CHANGING OPERATIONAL STATUS OF SMART DEVICE VIA VIRTUAL SWITCH BOARD

(71) Applicant: INTERNATIONAL BUSINESS MACHINES CORPORATION, Armonk, NY (US)

(72) Inventors: Girish Padmanabhan, Pune (IN); Shailendra Moyal, Pune (IN); Suyash Avinash Gupte, Vasind (IN)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 18/419,621

(22) Filed: Jan. 23, 2024

(65) Prior Publication Data
US 2025/0240350 A1 Jul. 24, 2025

(51) Int. Cl.
*H04L 67/125* (2022.01)
*G03H 1/22* (2006.01)
(Continued)

(52) U.S. Cl.
CPC ............. *H04L 67/125* (2013.01); *G03H 1/22* (2013.01); *G06F 3/0425* (2013.01);
(Continued)

(58) Field of Classification Search
CPC ....... H04L 67/125; G03H 1/22; G06F 3/0425; G06F 3/04817; G06T 19/006; G06V 40/23; H04N 9/31
See application file for complete search history.

(56) References Cited

U.S. PATENT DOCUMENTS 9,353,965 B1 * 5/2016 Goyal ..................... G06F 3/011
2015/0160738 A1 6/2015 Lithwick et al.
(Continued)

FOREIGN PATENT DOCUMENTS

CN     105527952 A     4/2016
CN     105676653 A     6/2016
(Continued)

OTHER PUBLICATIONS

Swetha et al., A Smart Controlling Application for Home Appliances Based On Virtual Touch Screen, International Journal of Engineering Research in Computer Science and Engineering, Retrieved from Internet: https://www.technoarete.org/common_abstract/pdf/IJERCSE/v6/17/Ext_68371.pdf, Published Date: vol. 6, Issue 7, Jul. 2019, 7 pages.
(Continued)

*Primary Examiner* — Rami R Okasha
(74) *Attorney, Agent, or Firm* — CHIP LAW GROUP

(57) ABSTRACT
A method, computer program product, and centralized control system for changing an operational status of a smart device via a virtual switch board (VSB). A determination is made that the operational status of the smart device needs to be changed. A user is located so that the user can perform a user action on the VSB. The VSB is generated. The VSB comprises an operation icon identifying an operational action on the smart device that changes the operational status of the smart device and a rejection icon that allows the user to reject performance of the operational action on the smart device. The VSB is displayed to the user. The user action of touching the operation icon or touching the rejection icon is captured by the image device and the operational status of the smart device is changed or not changed, respectively.

20 Claims, 8 Drawing Sheets

(51) Int. Cl.

| | |
|---|---|
| *G06F 3/042* | (2006.01) |
| *G06F 3/04817* | (2022.01) |
| *G06T 19/00* | (2011.01) |
| *G06V 40/20* | (2022.01) |
| *H04N 9/31* | (2006.01) |

(52) U.S. Cl.

CPC ........ *G06F 3/04817* (2013.01); *G06T 19/006* (2013.01); *G06V 40/23* (2022.01); *H04N 9/31* (2013.01)

(56) References Cited

U.S. PATENT DOCUMENTS

| | | | |
|---|---|---|---|
| 2018/0088741 A1* | 3/2018 | Matsumura | G06F 3/0416 |
| 2019/0024920 A1* | 1/2019 | Delgoshaei | F24F 11/30 |

FOREIGN PATENT DOCUMENTS

| | | |
|---|---|---|
| CN | 107807538 A | 3/2018 |
| CN | 109917913 A | 6/2019 |
| JP | 2009223490 A | 10/2009 |

OTHER PUBLICATIONS

Schmidt et al., PICOntrol: Using a Handheld Projector for Direct Control of Physical Devices through Visible Light, UIST, Retrieved from Internet: https://caoxiang.net/papers/uist2012_PICOntrol.pdf, Published Date: Oct. 2012, 10 pages.

Tap with US, TapXR, Retrieved on Jan. 3, 2024 from the Internet: https://www.tapwithus.com/, 9 pages.

Liang et al., Turn Any Display Into a Touch Screen Using Infrared Optical Technique, IEEE Access, Received Jan. 1, 2018, accepted Feb. 20, 2018, date of publication Mar. 6, 2018, date of current version Mar. 19, 2018, vol. 6, pp. 13033-13040.

Ritala et al., Context Aware User Interface System for Smart Home Control, Tampere University of Technology, HOIT 2003, Version 1.0 Feb. 6, 2003, Retrieved on Jan. 3, 2024 from the Internet: https://citeseerx.ist.psu.edu/document?repid=rep1&type=pdf&doi=e785449807d0f3b99f3f4591ed6f5017e1f2e75f, 13 pages.

Moreno et al., Designing user interfaces for content simplification aimed at people with cognitive impairments, Universal Access in the Information Society, Accepted: Jan. 30, 2023, 19 pages.

IFTTT, Best weather automations 2023, Retrieved on Jan. 3, 2024 from the Internet: https://ifttt.com/explore/weather-automations, 8 pages.

Sandnes et al., UbiWheel A simple context-aware universal control concept for smart home appliances that encourages active living, 2017 IEEE SmartWorld, Ubiquitous Intelligence & Computing, Advanced & Trusted Computed, Scalable Computing & Communications, Cloud & Big Data Computing, Internet of People and Smart City Innovation (SmartWorld/SCALCOM/UIC/ATC/CBDCom/IOP/SCI), San Francisco, CA, USA, 2017, pp. 1-6, doi: 10.1109/UIC-ATC.2017.8397460, Retrieved from Internet on Jan. 22, 2024: https://ieeexplore.ieee.org/.

* cited by examiner

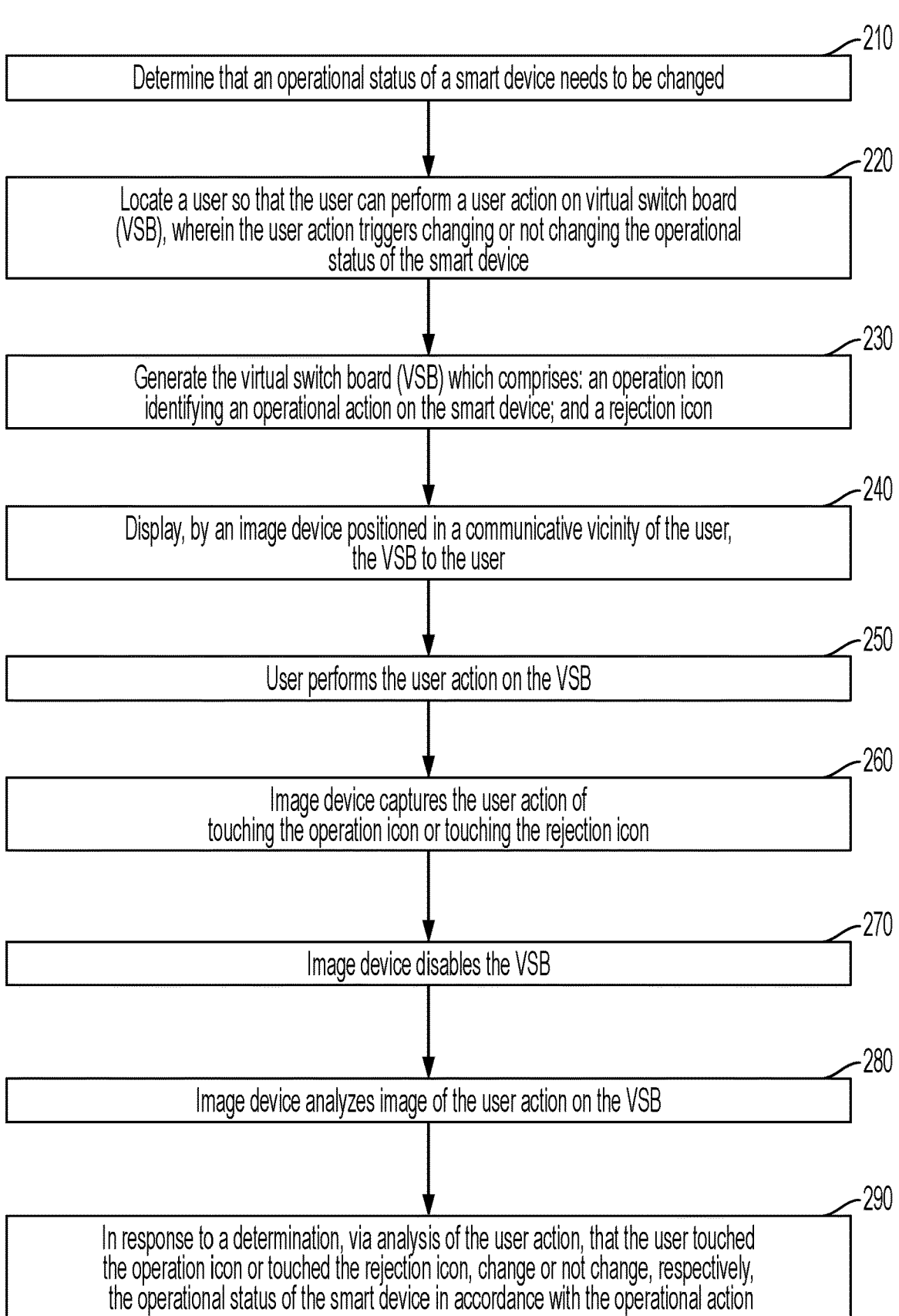

Determine that an operational status of a smart device needs to be changed
— 210

Locate a user so that the user can perform a user action on virtual switch board (VSB), wherein the user action triggers changing or not changing the operational status of the smart device
— 220

Generate the virtual switch board (VSB) which comprises: an operation icon identifying an operational action on the smart device; and a rejection icon
— 230

Display, by an image device positioned in a communicative vicinity of the user, the VSB to the user
— 240

User performs the user action on the VSB
— 250

Image device captures the user action of touching the operation icon or touching the rejection icon
— 260

Image device disables the VSB
— 270

Image device analyzes image of the user action on the VSB
— 280

In response to a determination, via analysis of the user action, that the user touched the operation icon or touched the rejection icon, change or not change, respectively, the operational status of the smart device in accordance with the operational action
— 290

Image device changes the operational status of the smart device in accordance with the operational action

FIG. 3A

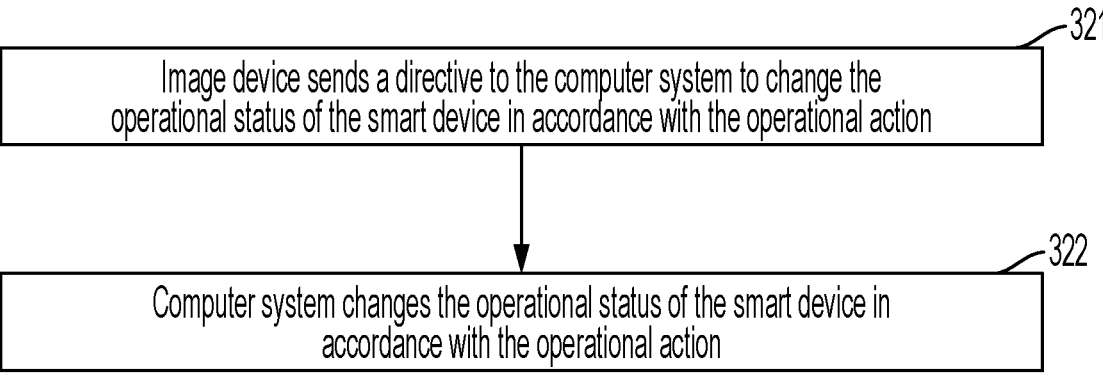

321

Image device sends a directive to the computer system to change the operational status of the smart device in accordance with the operational action

322

Computer system changes the operational status of the smart device in accordance with the operational action

FIG. 3B

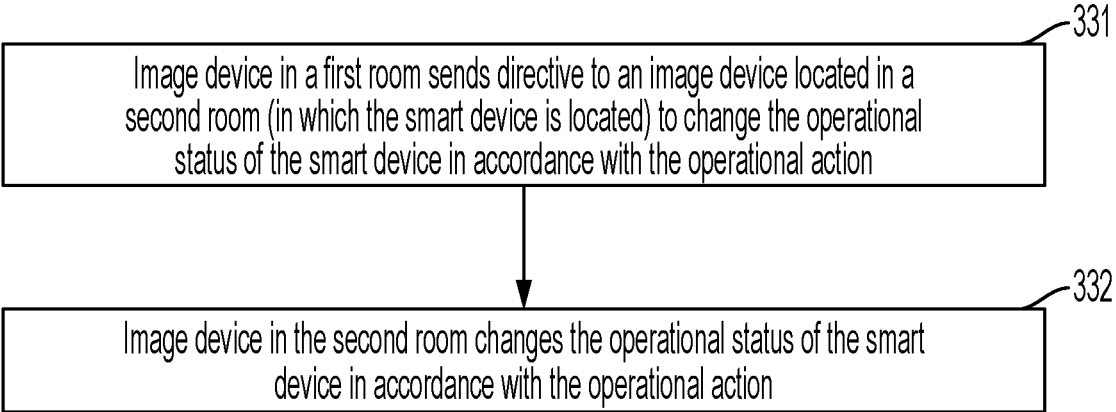

331

Image device in a first room sends directive to an image device located in a second room (in which the smart device is located) to change the operational status of the smart device in accordance with the operational action

332

Image device in the second room changes the operational status of the smart device in accordance with the operational action

FIG. 3C

CHANGING OPERATIONAL STATUS OF SMART DEVICE VIA VIRTUAL SWITCH BOARD

BACKGROUND

The present invention relates to changing an operational status of a smart device, and more specifically, to changing the operational status of the smart device via a virtual switch board (VSB).

SUMMARY

Embodiments of the present invention provide a method, a computer program product, and a centralized control system, for changing an operational status of a smart device via a virtual switch board (VSB).

A determination is made that the operational status of the smart device needs to be changed.

A user is located so that the user can perform a user action on the VSB. The user action triggers changing or not changing the operational status of the smart device.

The VSB is generated. The VSB includes an operation icon identifying an operational action on the smart device that changes the operational status of the smart device and a rejection icon that allows the user to reject performance of the operational action on the smart device.

The VSB is displayed to the user by an image device positioned in a communicative vicinity of the user.

The user action of touching the operation icon or touching the rejection icon is captured by the image device.

After the user action is captured, the VSB is disabled by the image device.

In response to a determination, via an analysis of the user action on the VSB, that the user touched the operation icon or touched the rejection icon, the operational status of the smart device is changed or not changed, respectively, in accordance with the operational action.

BRIEF DESCRIPTION OF THE DRAWINGS

FIG. 2 is a flow chart describing a method for operating a smart device via a virtual switch board (VSB) generated within a centralized control system, in accordance with embodiments of the present invention.

FIG. 3A is a flow chart describing a first embodiment of performing an operational action on the smart device, in accordance with embodiments of the present invention.

FIG. 3B is a flow chart describing a second embodiment of performing an operational action on the smart device, in accordance with embodiments of the present invention.

FIG. 3C is a flow chart describing a third embodiment of performing an operational action on the smart device, in accordance with embodiments of the present invention.

DETAILED DESCRIPTION

Figure 1:
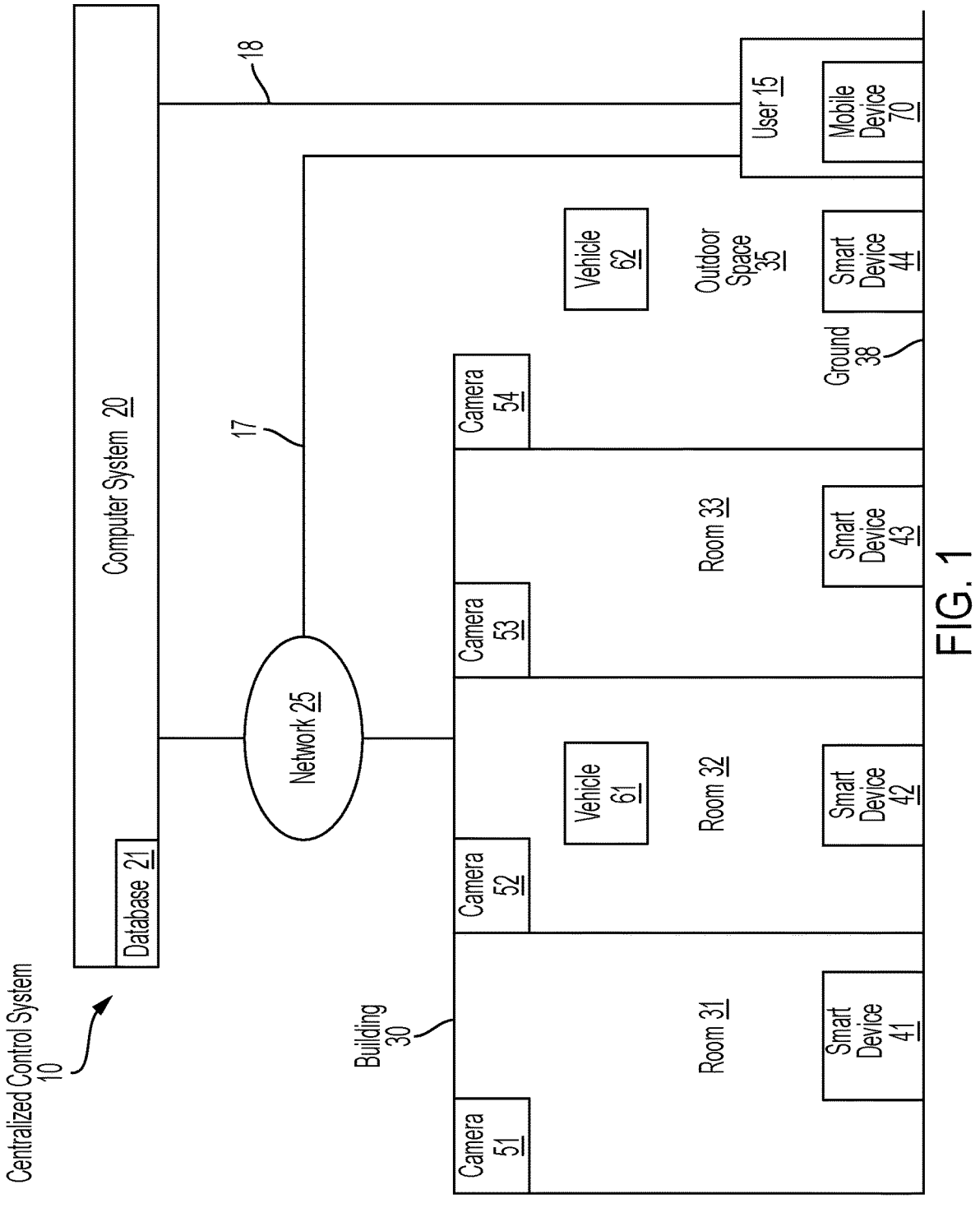
FIG. 1 depicts a centralized control system, in accordance with embodiments of the present invention.

Traditional switch boards are fixed and offer variety of switch controls at the same place with no clear distinction between their use (e.g., the switch for a fan and a tubelight cannot be differentiated without a marker or a label). Also, multiple switch boards may be needed to cover all the devices of a particular location. With traditional switch boards a user needs to be available near an appliance or device in order for the user to operate or use the appliance or device.

Smart devices use gestures and voice commands to operate, but with traditional switch boards there still is a need for the user to be in close proximity to these smart devices in order to operate the smart devices. Also, when providing voice commands to smart devices, it is necessary to use some directional voice command input or tagged voice commands to enable the smart device to be turned on or off to distinguish the smart device from a set of similar devices.

Sometimes based on user need, a user would like to go ahead with the manual operations (e.g., senior citizens who are not comfortable with providing voice commands). A mobile user interface (UI) on a mobile device makes it easy to access the controls, but a mobile UI is not simple and would display all the controls so that the user needs to know what to press on the mobile device. Also, with the screen size being small on a mobile device, there are limitations for specific people to operate the mobile device (e.g., users of certain age may find it difficult to operate the mobile device).

Embodiments of the present invention satisfy a need to simplify the operation of smart devices by providing easier access to controls and limiting the device options/controls shown to the user based on the actual need in real time.

Embodiments of the present invention provide a smarter way to manage the device controls of all devices for all types of users (e.g., experienced users; novice users of different age groups). Embodiments of the present invention enable all types of users in different categories and age groups to perform the actions for the target device with ease.

Embodiments of the present invention generate a virtual switch board (VSB) that provides a centralized, 'anywhere anytime' access to controls of smart devices as needed (e.g., by creating an 'anywhere anytime' virtual switch box with a collection of just the needed switches to operate multiple smart devices which the user has access to control).

In embodiments based on the smart device and user need, a dynamic switch identification from a centralized control system will be performed and the switch VSB is be generated virtually.

In embodiments, the VSB can be projected in the real world making the VSB highly accessible even to special needs users.

In embodiments, the VSB contains only the switches which are needed at a given time at the location where the user is positioned, so that just the required actions can be easily executed (i.e., embodiment of the present invention support different methods and operational benefits for an end user based on different attributes).

In embodiments, the type and size of the switch on the VSB can change based on user accessibility (e.g., a thicker switch customized for a user having thicker fingers would need bigger switches to be displayed to avoid mistakes; a disabled person lacking hands may need a special way to operate the VSB).

In embodiments, the smart device can be in vicinity of the user or remote from the user (e.g., if the user is in an office and wants to take action on devices at home, the controls of the smart device can be projected to the user in the user's office location).

Embodiments of the present invention include different switch types and sizes and operational features based on usage pattern, user behavior, environmental conditions (e.g., small or big sizes, touch or trip switches, hard and soft switches, etc.)

Embodiments of the present invention: can restrict access of particular switches to certain users (e.g., children), can easily add or/remove any switch, and easily replicate the whole collection of switches if needed.

In embodiments, the smart devices which need the user's intervention, and the device controls which need to be virtually displayed, can be predicted based on multiple factors such as, but not limited to, user body language (e.g., shivering to control a smart air conditioner in a room), smart device is kept on unnecessarily necessitating the VSB including a switching off of the smart device), usage history based display of device controls, etc.

In embodiments, the specific switches displayed can be restricted based on multiple factors. For example, if a child needs to operate a device, the option to increase the temperature beyond a particular value could be restricted. As another example, for senior citizens, the controls could be displayed in a more accessible manner (e.g., bigger switches).

Embodiments of the present invention enable auto-learning with the actions performed in different timelines, and with prioritization of the virtual switches based on the need.

Embodiments of the present invention can generate historical data analysis and improve the selection of collections of switches with different smart devices based on the user's validation of data analysis generated.

FIG. 1 depicts a centralized control system 10, in accordance with embodiments of the present invention.

The centralized control system 10 includes the following entities: a computer system 20, a network 25, cameras 51-54, and vehicles 61-62. The vehicle 61 and cameras 51-53 are within a building 30. The building 30 is on a ground 38. The vehicle 62 is outside of the building 30. The camera 54 is one or more cameras outside of the building 30, each outside camera independently affixed to the building 30 or to a fixed mechanical structure such as a tree or a pole.

Each camera of the cameras 51-54 is attached to a fixed structure such as a wall and is capable of projecting images, capturing images, and receiving images from sources configured to send the images to the vehicle.

Each of the vehicles 61-62 is aerial vehicle, a land based vehicle, or a marine (water) based vehicle. Each vehicle of the vehicles 61-62 does not require a human operator to be located within the vehicle and may be a remote controlled vehicle, an autonomously controlled vehicle (e.g., an aircraft controlled based on pre-programmed flight plans and may include an intelligence algorithm that would enable vehicle of the vehicles 61-62 to know the vehicle's location and self-determine a route to be near a specified smart device), a pre-programmed vehicle, a robotic-based vehicle, etc. Each vehicle of the vehicles 61-62 is configured to projecting images, capturing images, and receiving images from sources that sent the images to the vehicle.

In one embodiment, any two devices of the computer system 20, the vehicles 61-62, and the cameras 51-54, communicate via the network 25. Examples of the network 30 include, inter alia, the Internet, an Intranet, a Local Area Network (LAN), a Wide Area Network (WAN), etc.

In one embodiment, any two devices of the computer system 20, the vehicles 61-62, and the cameras 51-54, may communicate directly without an intervening network (e.g., via, inter alia, Bluetooth®, Per-to-Peer (P2P), etc.).

Figure 8:
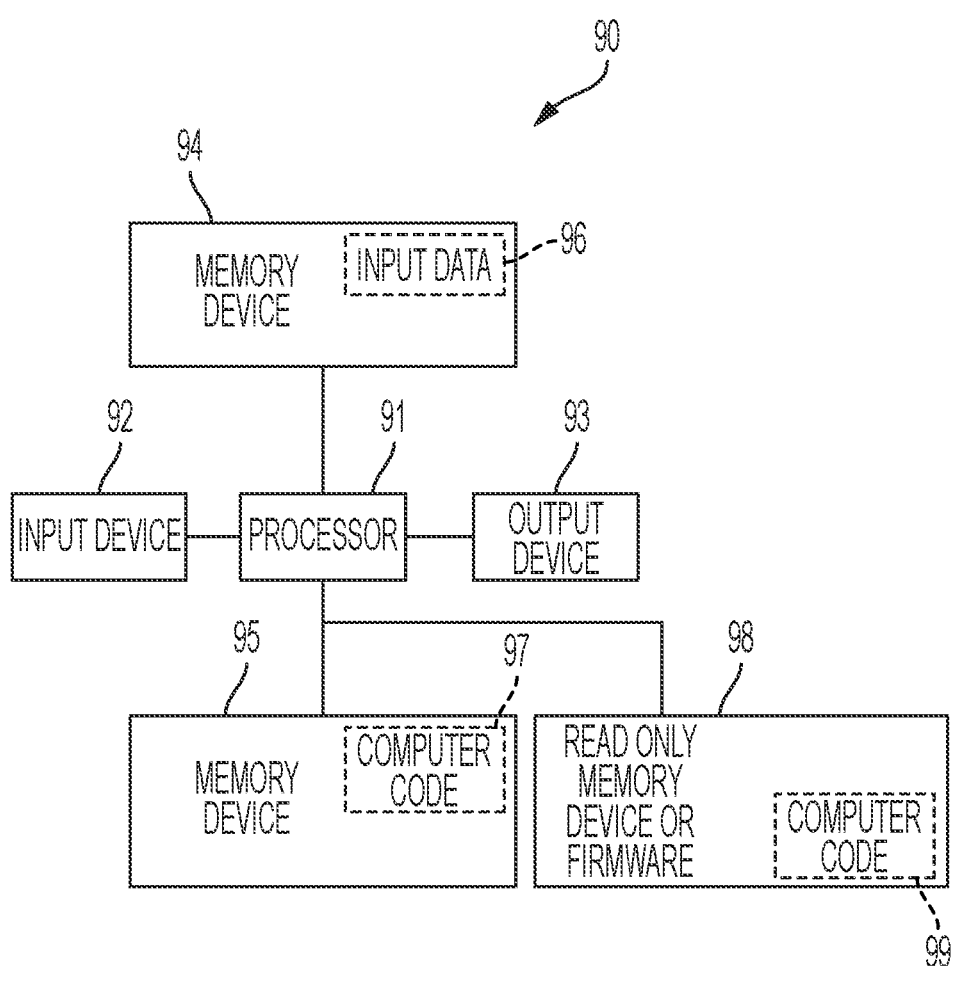
FIG. 8 illustrates a computer system, in accordance with embodiments of the present invention.

The computer system 20 is configured in accordance with the computer system 90 described infra in conjunction with FIG. 8. The computer system 90 comprises one or more processors, one or more memories, and one or more hardware storage devices.

The vehicles 61-62, and the cameras 51-54 each include features of the computer system 90 including one or more processors, one or more memories, and one or more hardware storage devices.

Thus, the centralized control system 10 includes one or more processors, one or more memories, and one or more hardware storage devices.

FIG. 1 depicts the following additional entities in the centralized control system 10: a building 30, an outdoor space 35 external to the building 30, a user 15 who may be located either in the outdoor space 35 (as shown) or within the building 30 (not shown), and a mobile device 70 carried by the user 15. The mobile device 70 may include, inter alia, a smart phone, a Personal Digital Assistant (PDA), a hand-held computer, a smartwatch, a fitness tracker, etc. The mobile device 70 is a smart device that may be operated by the user 15, but may be operational, in some embodiments, even if separated from the user 15.

The user 15 may communicate with any device in the computer system 20 (including the vehicles 61-62, the cameras 51-54, and the smart devices 41-44) via the network 25 using the mobile device 70 in conjunction with the communication channel or path 17. The user 15 may communicate directly with the computer system 20 using the mobile device 70 in conjunction with the communication channel or path 18.

The outdoor space 35 is exterior to the building 30 and the ground 38 may include, inter alia, a driveway, grass, sidewalk, etc.

The building 30 includes rooms 31, 32, and 33. Generally, the building 30 encompasses an indoor space that includes one or more rooms. The building 30 may be a home, an office building, a commercial building (e.g., a store), a warehouse, etc.

Room 31 includes a smart device 41 and the camera 51. Room 32 includes a smart device 42, the camera 52, and the vehicle 61. Room 33 includes a smart device 33 and the camera 53. Generally, a room may include zero or more cameras and zero or more smart devices.

Vehicle 61 is an indoor vehicle which is located in the indoor space of the building 30. Vehicle 62 is an outdoor vehicle.

Vehicle 62 and the smart device 44 are located in the outdoor space 35.

A smart device is an electronic or electrical device that may be communicatively connected to other smart devices, computer systems, or networks. Smart devices 41-44 may include, inter alia, a smart phone, a thermostat, a clock, a television, any appliance, a toaster, an oven, a microwave oven, a refrigerator, a vacuum cleaner, a light switch, a light dimmer, a heater, a car, a watch, a lock, a dishwasher, a lawn mower, a snow blower, etc. In addition to smart devices 41-44, the cameras 51-54 and vehicles 61 and 62 are smart devices. Also, the computer system 20 has smart device capabilities by being communicatively connected to the smart devices 41-44, the cameras 51-54, and the vehicles 61-62.

In one embodiment, the vehicles 61 and 62 are each controlled remotely by the computer system 20, the user 15, another vehicle, or any of the cameras 51-54.

In one embodiment, the indoor vehicle 61 may be smaller than the outdoor vehicle 62 and is designed to navigate in a confined space, namely within any room of the building 30.

In one embodiment, the computer system 20 comprises and has access to a database 21 disposed within one or more hardware storage devices in the computer system 20. The database 21 stores the architecture of FIG. 1 including all of the devices, information associated with the devices, and the communication paths that enables the devices to communicate with each other and one another, which includes the network 25, the cameras 51-54, the vehicles 61-62, the smart devices 41-44, and the mobile device 70 of the user 15. The information associated with the devices include location of the devices, location of the user 15, a profile of the user 15, and relationships between and among the devices that have been described supra in conjunction with FIG. 1, and further includes the current ON/OFF status of each smart device as well as the current value of each parameter of each smart device.

The computer system 20 may control the operational status each of the smart devices 41-44, including changing the ON/OFF status of each smart device to ON or OFF, and changing the value of each parameter of each device.

FIG. 2 is a flow chart describing a method for operating a smart device via a virtual switch board (VSB) generated within a centralized control system, in accordance with embodiments of the present invention. The method of FIG. includes steps 210-290.

Step 210 determines that an operational status of the smart device needs to be changed.

In one embodiment, the operational status of the smart device is an ON status (i.e., the smart device in on) or an OFF status (i.e., the smart device is off), wherein the needed change is a change of the ON status to the OFF status or from the OFF status to the ON status, respectively.

In one embodiment, the operational status of the smart device is a value of a parameter controlled by the smart device, wherein the needed change is a change in the parameter. For example, if the smart device is a thermostat and the parameter is temperature controlled by the thermostat, the needed change is a change in the temperature controlled by the thermostat. As another example, if the smart device is a microwave oven and the parameter is power level (e.g., 10%, 20%, . . . , 100%), the needed change is a change in the power level.

Ascertaining that the operational status of the smart device needs to be changed can be accomplished via, inter alia, the user's body language, a determination that the smart device is unnecessarily on, a determination that the smart device is off but should be on, and a usage history-based display of smart device controls to the user.

In embodiments of the present invention, the body language of the user 15 may be viewed and recorded by one of the cameras (51, 22, 53, 54) or one of the vehicles (61, 62) that is sufficiently near the user to view and record the user's body language (see FIG. 1). The camera or vehicle that viewed and recorded the user's body language then sends the user's body language, or data describing the user's body language, to the computer system 20 which receives the user's body language that was sent. The computer system 20 stores, in the database 21, different body language configurations of the user and determines which operation status of a smart device may need to be changed in association with each stored body language configuration. After receiving the user's body language, the computer system 20 determines an operational status of a smart device that needs to be changed by the user, based on a comparison of the received body language of the user with the stored body language configurations of the user. The comparison and/or the determination of the operational status of the smart device that needs to be changed by the user utilizes, as needed, the entities and associated information stored in the database 21.

Figure 4:
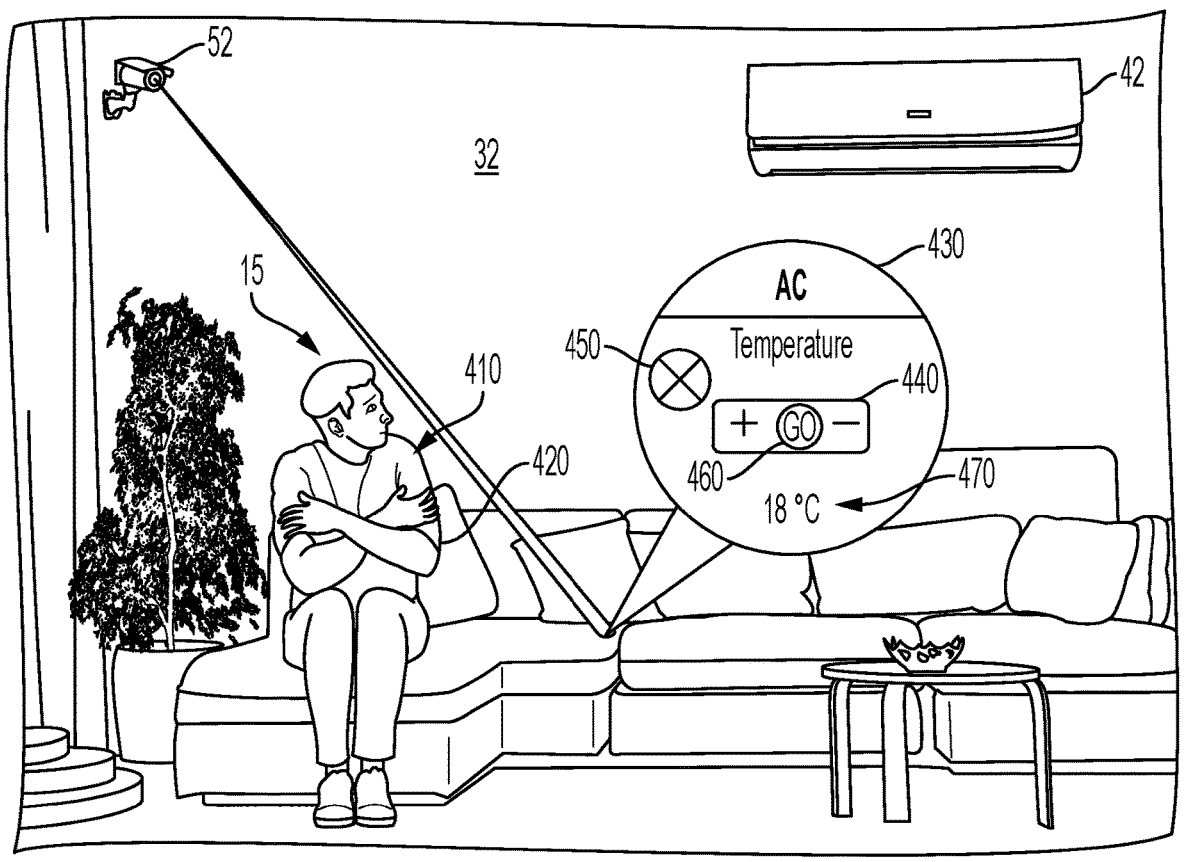
FIG. 4 depicts an illustrative VSB for changing the operational status (temperature) of a smart device (air conditioner) in a room, in accordance with embodiments of the present invention.

An example of the user's body language, namely shivering, is described infra in conjunction with FIG. 4.

Another example of the user's body language is the user mowing grass with a lawnmower in outdoors 35 (see FIG. 1), wherein the user 15 is not in physical contact with the lawnmower and is looking in a direction away from the lawnmower. The preceding body language of the user may be detected by the vehicle 62. The needed change is turning off the smart device 44 (i.e., the lawnmower).

Another example of the user's body language is the user 15, in room 32, covering the user's eyes with one or both of the user's hands (see FIG. 1) which may suggest that the light in the room 32 is too bright. The preceding body language of the user may be detected by the camera 52 or the vehicle 61. The needed change is dimming the light in the room 32 by changing a dimmer value of the smart device 42 (i.e., a light dimmer).

In order for cameras or vehicles to view and record the body language of the user, the user must opt-in (i.e., consent) to such viewing and recording of the body language of the user by the cameras or vehicles for the purpose of determining an operational status of a smart device that needs to be changed by the user via a user action performed on a virtual switch board associated with the smart device.

In embodiments of the present invention, a determination that the smart device is unnecessarily on includes detecting the smart device, by one of the cameras (51, 52, 53, 54) or one of the vehicles (61, 62) that is sufficiently near the smart device, to view the smart device and determine that the smart device is unnecessarily on. The determination that the smart device is unnecessarily on may be made in conjunction with the database 21 storing conditions under which the smart device is unnecessarily on. Examples of such conditions stored in the database 21 include, inter alia: the smart device (e.g., a television, vacuum cleaner, or other smart device or appliance) is on in a room in which the user is not present or has not been present for a designated period of time that may be specific to the device or appliance (e.g., 30 minutes); a smart device or appliance has been ON for more than a specified time threshold; a smart device of a furnace is on where the outside temperature is measured to be uncomfortably hot (e.g., 90 degrees F. or higher).

In embodiments of the present invention, a determination that the smart device is off but should be on includes detecting the smart device, by one of the cameras (51, 52, 53, 54) or one of the vehicles (61, 62) that is sufficiently near the smart device to view the smart device and determine that the smart device is off but should be on. The determination that the smart device is off but should be on is made in conjunction with the database 21 storing conditions under which the smart device is off but should be on. Such detection would ascertain that the smart device needs to be turned on. Examples of such conditions stored in the database 21 include, inter alia: at night, the user appears to be reading printed matter (e.g., a book) in an unlighted room that includes a smart device of a light that should be turned on to improve the user's ability to read the printed matter; a frozen bagel is in a smart device of a microwave oven for a specified period of time (e.g., 5 minutes) during which the microwave oven is off but should be on to defrost the bagel; a smart device of a clock on a wall is off but should be on; a smart device of a furnace is off but should be on because the outside temperature is measured to be uncomfortably cold (e.g., zero degrees F. or lower).

In embodiments of the present invention, a usage history-based display of smart device controls to the user may be used to ascertain that the operational status of the smart device needs to be changed by the user. The smart device controls pertain to controlling the operational status of the smart device. Thus, the device controls encompass control of: the ON status of the smart device, the OFF status of the smart device, and one or more parameters controlled by the smart device.

In one embodiment, the usage history-based display of smart device controls is auto learned with the VSB and associated actions on device controls performed at different times resulting in prioritization of the device controls based on the historical similarity of multiple occurrences of the display of the smart device controls. Such display of the smart device controls is in in accordance with step 240 described infra, which displays the VSB to the user, wherein the VSB includes a device control. Thus, embodiments of the present invention may perform historical data analysis to help improve the selection of VSBs and associated device controls. Such embodiments can include the user's validation of the performed historical data analysis. The computer system 20 stores, in the database 21, the usage history-based display of smart device controls.

Step 220 locates the user 15 so that the user 15 can perform a user action on the VSB, wherein the user action triggers changing or not changing the operational status of the smart device.

In one embodiment, the user 15 carrying the mobile device 70 can be located via a signal transmitted by the mobile device 70, wherein the signal can be received by the computer system 20 or by any image device of the cameras 51-54 or the vehicles 61-62.

In one embodiment, the user 15 can be located by an image device (i.e., a device selected from the cameras 41-44 and the vehicles 61-62) that captures an image of the user 15, wherein the user 14 is located with an image range of the image device. An image range is a range of distance, from the image device, within which an image can be captured.

Step 230 generates the virtual switch board (VSB) which comprises an operation icon depicting an operational action on the smart device that changes the operational status of the smart device and a rejection icon that enables the user 15 to reject performance of the operational action on the smart device. As discussed in step 250 described infra, (i) touching the operation icon by the user 15 triggers changing the operational status of the smart device and (ii) touching the rejection icon by the user 15 triggers not changing the operational status of the smart device.

The VSB is generated by: (i) the computer system 20 or (ii) an image device positioned in a communicative vicinity of the user and thus able to display VSB to the user in step 240 discussed infra. In one embodiment, the image device is either one of the cameras (51, 52, 53, 54) or one of the vehicles (61, 62). The image device being in a communicative vicinity of the user means that the image device is sufficiently near the user so as to enable the user to change the operational status of the smart device by touching an operation icon in the VSB.

If the computer system 20 generates the VSB, then the computer system 20 sends the VSB to the image device positioned in a communicative vicinity of the user.

If the image device generates the VSB, then the VSB is generated by the image device in response to the image device receiving a directive by the computer system 20 to generate the VSB and after the computer system 20 sends sufficient data to the image device to enable the image device to generate the VSB.

Step 240 displays, by the image device positioned in a communicative vicinity of the user, the VSB to the user. In one embodiment, the image device alerts the user of the displayed VSB via the mobile phone of the user.

Figure 5:
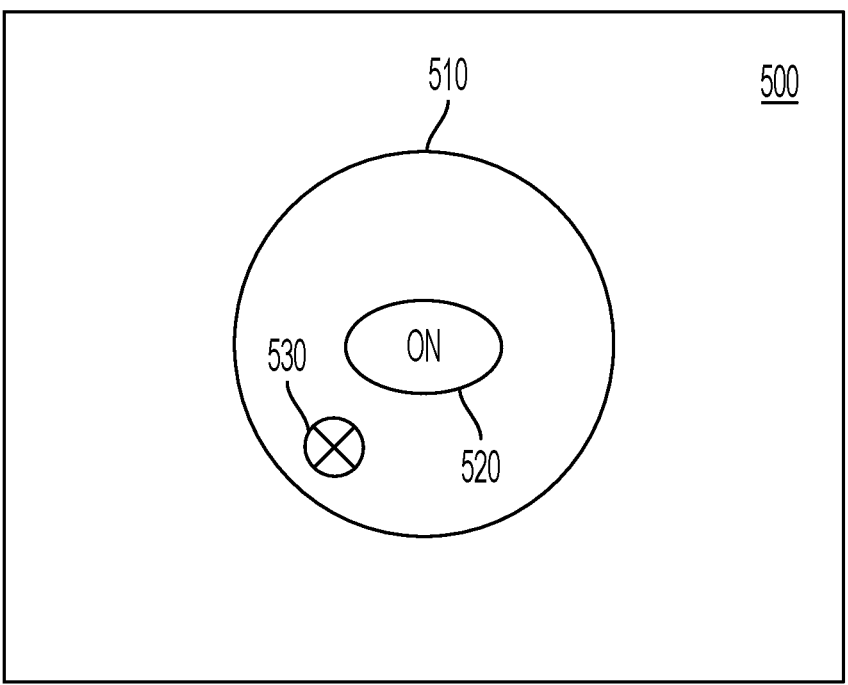
FIG. 5 depicts an illustrative VSB comprising an operation icon of ON and a rejection icon, in accordance with embodiments of the present invention.
Figure 6:
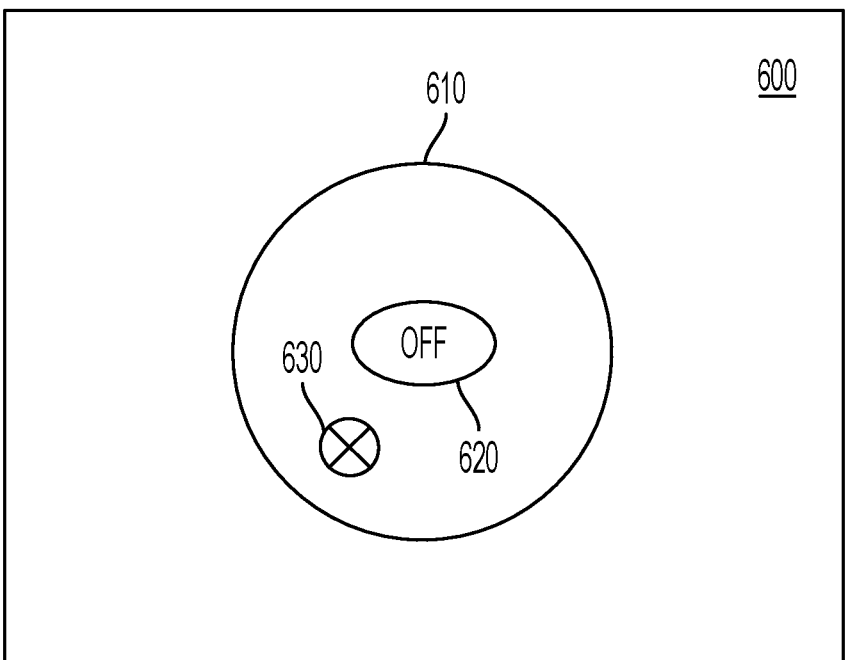
FIG. 6 depicts an illustrative VSB comprising an operation icon of OFF and a rejection icon, in accordance with embodiments of the present invention.
Figure 7:
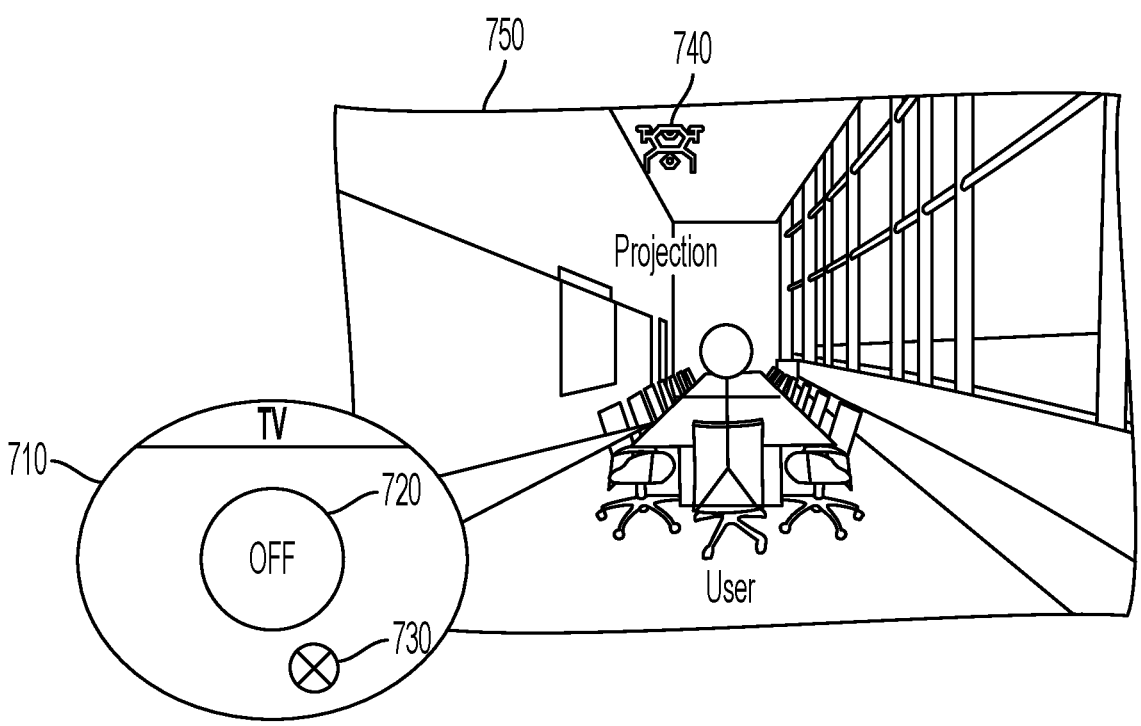
FIG. 7 illustrates an illustrative VSB in an office, in accordance with embodiments of the present invention.

The VSB is displayed (i) on a physical surface (e.g., a wall, a floor, the ground, a surface of a table or desk, etc. as depicted in FIGS. 5 and 6 described infra) or (ii) within a portion of a space that is not on any physical surface (e.g., the VSB 430 in FIG. 3 described infra and the VSB 710 in FIG. 7 described infra).

In one embodiment, displaying a VSB within a portion of space that is not on a physical surface may be implemented by having the image device (i.e., camera or vehicle) include an image projector having an ability, using sensors and/or specialized algorithms in the camera or vehicle, to create augmented reality (AR) experiences by projecting the VSB into three-dimensional space via overlaying digital information onto the real-world environment.

In one embodiment, displaying a VSB within a portion of space that is not on a physical surface may comprise the image device projecting the VSB within the portion of the space as a holographic display or a volumetric display. To implement a holographic display, the image device (i.e., camera or vehicle) uses light diffraction to create a three-dimensional image of the VSB that appears to float in space without the need for a physical surface. Implementing a volumetric display creates a three-dimensional image of the VSB within a volume of space, allowing the user 15 to see the VSB from different angles.

In step 250, the user 15 performs a user action on the VSB, namely the user 15 touches the operation icon or touches the rejection icon. Touching the operation icon triggers changing the operational status of the smart device. Touching the rejection icon triggers not changing the operational status of the smart device.

In step 260, the image device captures the user action on the VSB.

In step 270, the image device disables the VSB (i.e., causes the VSB to disappear).

In step 280, the image device analyzes the user action on the VSB to determine whether the user touched the operation icon or touched the rejection icon.

In an embodiment, the user and the image device are in an outdoor environment that includes a ground on which the user is positioned, wherein displaying the VSB comprises displaying the VSB on the ground. In one embodiment, the ground includes a muddy surface, wherein said displaying the VSB comprises displaying the VSB on the muddy surface, and wherein the analysis determined that the user touched the operation icon with the user's muddy finger or with the user's elbow.

In step 290, in response to a determination, via the analysis of the user action on the VSB in step 280, that the user touched the operation icon or touched the rejection icon, the operational status of the smart device is changed or not changed, respectively, in accordance with the operational action identified by the operation icon.

First, second, and third embodiments for performing the operational action on the smart device are described infra in conjunction with FIGS. 3A, 3B and 3C, respectively.

FIG. 3A is a flow chart describing a first embodiment of performing the operational action on the smart device, in accordance with embodiments of the present invention. The flow chart of FIG. 3A includes step 310.

In step 310, the image device changes the operational status of the smart device in accordance with the operational action.

FIG. 3B is a flow chart describing a second embodiment of performing the operational action on the smart device, in accordance with embodiments of the present invention. The flow chart of FIG. 3B includes steps 321-322.

In step 321, the image device sends a directive to the computer system to change the operational status of the smart device in accordance with the operational action.

After the computer system receives the directive from the image device, in step 322 the computer system changes the operational status of the smart device in accordance with the operational action.

FIG. 3C is a flow chart describing a third embodiment of performing the operational action on the smart device, in accordance with embodiments of the present invention. The flow chart of FIG. 3C includes steps 331-332.

In the third embodiment, the smart device is in a second room (e.g., kitchen) that differs from a first room (e.g., office) in which a first image device and the user are located. In one embodiment, the first and second rooms are different rooms in a same building such as inter alia as a residential house. In one embodiment the first and second rooms are in different buildings, such as inter alia the first room being in an office building and the second room being in a residential house.

In step 331, the first image device in the first room (in which the user is located) sends a directive to a second image device located in the second room (in which the smart device is located) to change the operational status of the smart device in accordance with the operational action.

After the second image device in the second room receives the directive from the first image device in the first room, in step 332, the second image device in the second room changes the operational status of the smart device in accordance with the operational action.

FIG. 4 depicts an illustrative VSB 430 for changing the operational status (temperature) of the smart device 42 (air conditioner) in room 32 (see FIG. 1), in accordance with embodiments of the present invention. The VSB 430 is displayed to the user 15 and includes the operation icon 440 and the rejection icon 450. FIG. 4 illustrates the VSB 430 as being within a portion of space that is not on a physical surface.

In FIG. 4, the camera 52 is the image device that displays the VSB 430 to the user 15. An image projection device may be, inter alia, a camera (e.g., one of the cameras 51-54) or a vehicle (e.g., vehicle 61 or 62) that displays the VSB 430 to the user and detects the action on the VSB 430 by the user.

If the user 15 touches the operation icon 440 of the VSB 430, then the operational status of the smart device 32 (air conditioner) is changed in accordance with the operational action identified by the operation icon 440. The action of touching (with a touch device such as the user's finger, a pen, a stick, etc.) the operation icon 440 includes touching the plus (+) N times and/or touching the minus (−) on the operation icon 440 M times to increase or decrease the temperature setting on the thermostat by N degrees C. and/or M degrees C., respectively. For example if N=3 and M=0, then 3 touches of the plus (+) increases the temperature setting on the air conditioner by 3 degrees C. The temperature 470 is the temperature to be set for the smart device 42 (air conditioner) as a result of the user's touch of the plus (+) and/or the minus (−) on the operation icon 440 N times and/or M times, respectively.

The VSB 430 illustrates a feature of filtered controls that can be operated upon by the user. Specifically, the VSB 430 includes only the control of temperature which the user has a current need to adjust and does not include other controls for the air conditioner (e.g., fan speed, humidity, timer for clock control of temperature) which the user does not have a current need to adjust. The preceding feature provides a selectivity of control that simplifies operational control of the smart device by the user.

The action of touching the operation icon 440 concludes with the user 250 touching the GO portion 460 of the operation icon 440 to communicate that the action of touching the operation icon 440 has concluded. The camera 52 captures images of the user's N and/or M touches on the VSB 430.

If the user 50 touches the rejection icon 450, then the VSB 430 is disabled (i.e., disappears) without changing the operational status of the smart device 42 (air conditioner). Generally, the rejection icon allows the user to elect to not change the operational status of the VSB.

In response to the user's touching of the GO portion of the operation icon 440 or the user's touching of the rejection icon 450, the VSB 430 is disabled (i.e., the VSB 430 disappears).

FIG. 5 depicts an illustrative VSB 510 comprising an operation icon 520 of ON and a rejection icon 530, in accordance with embodiments of the present invention. The VSB 510, which is projected onto physical surface 500, enables an associated smart device to be turned on by use of a touch device that touches the operation icon 520 under control of the user 15. The VSB 510 allows the user to cause the VSB 510 to be disabled (i.e., cause the VSB 510 to disappear) without changing the operational status of the smart device (i.e., without turning the display device on) by use of a touch device that touches the rejection icon 530 under control of the user 15. Alternatively, instead of the VSB 510 being projected onto physical surface 500, the VSB 510 may be displayed within a portion of space that is not on a physical surface as illustrated supra in conjunction with FIG. 4 and illustrated infra in conjunction with FIG. 7.

FIG. 6 depicts an illustrative VSB 610 comprising an operation icon 620 of OFF and a rejection icon 630, in accordance with embodiments of the present invention. The VSB 610, which is projected onto physical surface 600, enables an associated smart device to be turned off by use of a touch device that touches the operation icon 620 under control of the user 15. The VSB 610 allows the user 15 to cause the VSB 610 to be disabled (i.e., cause the VSB 610 to disappear) without changing the operational status of the smart device (i.e., without turning the smart device off) by use of a touch device that touches the rejection icon 630 under control of the user 15. Alternatively, instead of the VSB 610 being projected onto physical surface 600, the VSB 610 may be displayed within a portion of space that is not on a physical surface as described supra and illustrated in FIG. 3 described supra and in FIG. 7 described infra.

In one embodiment, an image device (e.g., camera or vehicle) at the user's smart home will, together with the computer system 20, identify the VSB and associated OFF operation icon needed to be displayed to the user to switch off a television (TV) in the user's smart home. The image device interacts with the user's mobile device which is currently with the user in an office of the user. The mobile device and the image device are configured to talk to each other since both are configured to be part of the user's smart home. If the mobile device of the user is not accessible by the user, the mobile device can instead talk to another image device in the office location which can display the VSB to the user in the office as illustrated in FIG. 7 described infra. Based on the user action of the user on the VSB, the action may be returned back to the image device at home via the user's mobile device. The image device in the user's smart home can now take control of the TV and take appropriate action which in this case is switching off the TV.

FIG. 7 illustrates an illustrative VSB 710 in an office 750, in accordance with embodiments of the present invention. The VSB 710 includes an operation icon 720 of OFF (to turn a remote TV off) and a rejection icon 730. The VSB 710 is displayed by an image device 740 (e.g., drone or camera) within a portion of space that is not on a physical surface.

The type and size of the operation icon and/or rejection icon in the VSB can be based on user accessibility. For example, the size of the rejection icon may be adjusted to accommodate the thickness of the fingers of the user. Thus, a user with thicker fingers may need a bigger operation icon and a bigger rejection icon to be displayed in the VSB to avoid mistakes by the user when attempting to touch the operation icon or touch the rejection icon. As another example, a disabled user may need a special way to interact with the VSB (e.g., the disabled user may lack fingers). The user's profile, which includes, inter alia, relevant information needed to determine the type and size of the operation icon and the rejection icon on the VSB, is stored in the database 21 of the computer system 20.

The smart device can be in a vicinity of the user or can be remote from the user. For example, if the user is in an office and wants to take action on a smart device located at home, the pertinent VSB of the smart device at home can be displayed to the user in the user's office. As another example, if the user is in the user's garden and has muddy hands and needs to operate a microwave in the user's house, a vehicle could come by and display the VSB with a broader ON operation icon, so that the user can select the ON operation icon using the user's elbow or even using the user's muddy hands since the VSB can be displayed on the mud in the user's garden. Operation of the VSB by the user to turn on the microwave is simplified by the presence of only the ON operation icon in the VSB and absence of all other microwave controls that are not currently needed (e.g., power level, fan speed).

The operation icon and the rejection icon in the VSB can be restricted based on multiple factors. For example, if a child needs to operate the smart device (e.g., a thermostat), an option to increase the temperature beyond a particular value could be restricted, so that the VSB would not show the full range of increased temperature control. As another example, for senior citizens, the operation icon and rejection icon may be displayed in a more accessible manner (e.g., bigger operation icon and bigger rejection icon).

FIG. 8 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 99 (e.g., including algorithms) may be stored on a static, nonremovable, read-only storage medium such as a Read-Only Memory (ROM) device 98, or may be accessed by processor 91 directly from such a static, nonremovable, read-only medium 98. Similarly, in some embodiments, stored computer program code 99 may be stored as computer-readable firmware, or may be accessed by processor 91 directly from such firmware, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

A computer program product of the present invention comprises one or more computer readable hardware storage devices having computer readable program code stored therein, said program code containing instructions executable by one or more processors of a computer system to implement the methods of the present invention.

A centralized control system used in embodiments of the present invention, including the computer system 90, comprises one or more processors, one or more memories, and one or more computer readable hardware storage devices, said one or more hardware storage devices containing program code executable by the one or more processors via the one or more memories to implement the methods of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 9:
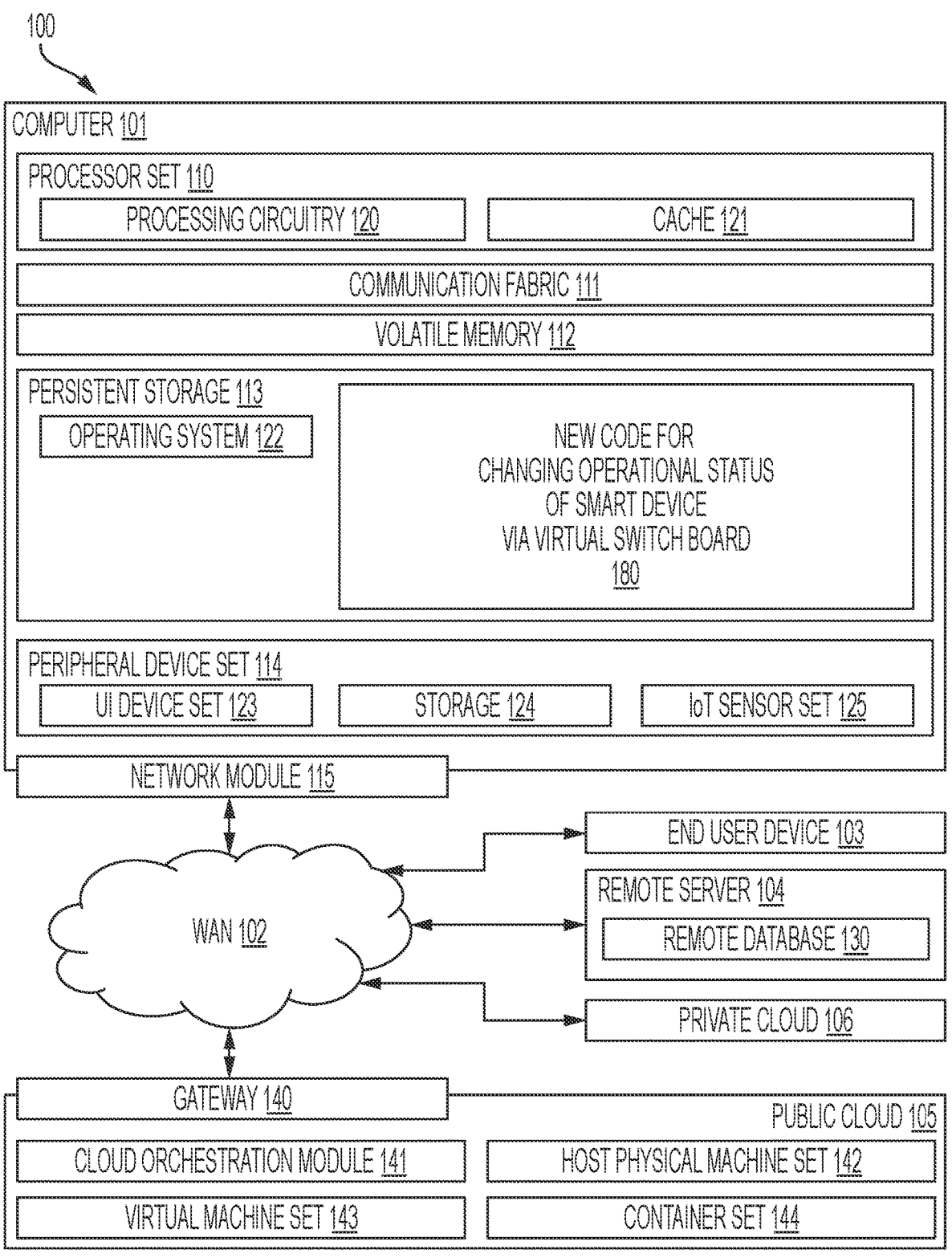
FIG. 9 depicts a computing environment which contains an example of an environment for the execution of at least some of the computer code involved in performing the inventive methods, in accordance with embodiments of the present invention.

FIG. 9 depicts a computing environment 100 which contains an example of an environment for the execution of at least some of the computer code involved in performing the inventive methods, in accordance with embodiments of the present invention. Such computer code includes new code for changing an operational status of a smart device via a virtual switch board 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for changing an operational status of a smart device via a virtual switch board (VSB) generated within a centralized control system, said method comprising:

determining that the operational status of the smart device needs to be changed;

locating a user so that the user can perform a user action on the VSB, wherein the user action triggers changing or not changing the operational status of the smart device;

generating the VSB, said VSB comprising an operation icon identifying an operational action on the smart device that changes the operational status of the smart device and a rejection icon that allows the user to reject performance of the operational action on the smart device;

displaying, by an image device positioned in a communicative vicinity of the user, the VSB to the user;

capturing, by the image device, the user action of touching the operation icon or touching the rejection icon;

after said capturing the user action, disabling, by the image device, the VSB; and in response to a determination, via an analysis of the user action on the VSB, that the user touched the operation icon or touched the rejection icon, changing or not changing, respectively, the operational status of the smart device in accordance with the operational action.

2. The method of claim 1, wherein said determining that the operational status of the smart device needs to be changed is accomplished via the user's body language, a determination that the smart device is unnecessarily on, a determination that the smart device is off but should be on, or a usage history-based display of smart device controls to the user.

3. The method of claim 1, wherein said locating the user is accomplished via receiving a signal transmitted by a mobile device being carried by the user or via said image device capturing an image of the user.

4. The method of claim 1, wherein said generating the VSB is performed by the image device or by a computer system within the centralized control system, wherein the computer system is communicatively coupled to the image device and the smart device.

5. The method of claim 1, wherein said displaying the VSB to the user comprises displaying the VSB on a physical surface or within a portion of a space that is not on any physical surface.

6. The method of claim 1, wherein the analysis of the user action on the VSB determined that the user touched the rejection icon.

7. The method of claim 1, wherein the analysis of the user action on the VSB determined that the user touched the operation icon.

8. The method of claim 7, wherein said changing the operational status of the smart device comprises changing an ON status of the smart device to an OFF status or changing the OFF status to the ON status.

9. The method of claim 7, wherein said changing the operational status of the smart device comprises changing a value of a parameter of the smart device.

10. The method of claim 1, said method comprising:
adjusting a size of the rejection icon to accommodate a thickness of the fingers of the user.

11. A computer program product, comprising one or more computer readable hardware storage devices having computer readable program code stored therein, said program code containing instructions executable by one or more processors of a computer system to implement a method for changing an operational status of a smart device via a virtual switch board (VSB) generated within a centralized control system, said method comprising:
determining that the operational status of the smart device needs to be changed;
locating a user so that the user can perform a user action on the VSB, wherein the user action triggers changing or not changing the operational status of the smart device;
generating the VSB, said VSB comprising an operation icon identifying an operational action on the smart device that changes the operational status of the smart device and a rejection icon that allows the user to reject performance of the operational action on the smart device;
displaying, by an image device positioned in a communicative vicinity of the user, the VSB to the user;
capturing, by the image device, the user action of touching the operation icon or touching the rejection icon;
after said capturing the user action, disabling, by the image device, the VSB; and
in response to a determination, via an analysis of the user action on the VSB, that the user touched the operation icon or touched the rejection icon, changing or not changing, respectively, the operational status of the smart device in accordance with the operational action.

12. The computer program product of claim 11, wherein the image device that captures the user action is a first image device, wherein the user and the first image device are located in a first room, wherein the smart device is located in a second, different room, wherein the analysis determined that the user touched the operation icon, and wherein the method comprises:
sending, by the first image device, a directive to a second image device located in the second room to perform said changing the operational status of the smart device in accordance with the operational action;
after the second image device has received the directive from the first device, changing, by the second device, the operational status of the smart device in accordance with the operational action.

13. The computer program product of claim 11, wherein said determining that the operational status of the smart device needs to be changed is accomplished via a usage history-based display of smart device controls to the user, and wherein the usage history-based display of smart device controls is auto learned with the VSB and associated actions on device controls performed at different times resulting in prioritization of the device controls based on the historical similarity of multiple occurrences of the display of the smart device controls.

14. The computer program product of claim 11, wherein the user and the image device are in an outdoor environment that includes a ground on which the user is positioned, and wherein said displaying the VSB comprises displaying the VSB on the ground.

15. The computer program product of claim 14, wherein the ground includes a muddy surface, wherein said displaying the VSB comprises displaying the VSB on the muddy surface, and wherein the analysis determined that the user touched the operation icon with the user's muddy finger or with the user's elbow.

16. A centralized control system, comprising one or more processors, one or more memories, and one or more computer readable hardware storage devices, said one or more hardware storage devices containing program code executable by the one or more processors via the one or more memories to implement a method for changing an operational status of a smart device via a virtual switch board (VSB) generated within the centralized control system, said method comprising:
determining that the operational status of the smart device needs to be changed;
locating a user so that the user can perform a user action on the VSB, wherein the user action triggers changing or not changing the operational status of the smart device;
generating the VSB, said VSB comprising an operation icon identifying an operational action on the smart device that changes the operational status of the smart device and a rejection icon that allows the user to reject performance of the operational action on the smart device;
displaying, by an image device positioned in a communicative vicinity of the user, the VSB to the user;
capturing, by the image device, the user action of touching the operation icon or touching the rejection icon;
after said capturing the user action, disabling, by the image device, the VSB; and in response to a determination, via an analysis of the user action on the VSB, that the user touched the operation icon or touched the rejection icon, changing or not changing, respectively, the operational status of the smart device in accordance with the operational action.

17. The centralized control system of claim 16, wherein the image device is a camera.

18. The centralized control system of claim 16, wherein the image device is a vehicle that does not require a human operator and does not contain the human operator, and wherein the smart device, the vehicle, and the user are located in a room of a building.

19. The centralized control system of claim 16, wherein the image device is configured to project images, capture images, and receive images from sources that sent the images to the vehicle.

20. The centralized control system of claim 16, comprising a computer system, the image device, and a mobile device carried by the user, wherein the computer system is communicatively coupled to the image device, the smart device, and the mobile device, and wherein said generating the VSB is performed by the computer system.

*    *    *    *    *